T. BROWN.
MANURE SPREADER.
APPLICATION FILED NOV. 10, 1905.

947,277.

Patented Jan. 25, 1910.

Witnesses
Roy D. Tolman.
Penelope Comberbach

Inventor
Theophilus Brown
By Rufus B. Fowler
Attorney

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

947,277.    Specification of Letters Patent.    Patented Jan. 25, 1910.

Application filed November 10, 1905. Serial No. 286,671.

*To all whom it may concern:*

Be it known that I, THEOPHILUS BROWN, a citizen of the United States, residing at Worcester, in the county of Worcester and Commonwealth of Massachusetts, have invented a new and useful Improvement in Manure-Spreaders, of which the following is a specification, accompanied by drawings forming a part of the same, in which—

Figure 1:
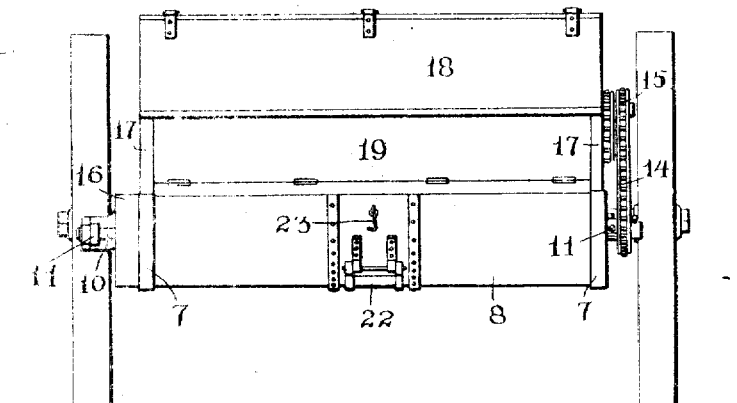
Figure 2:
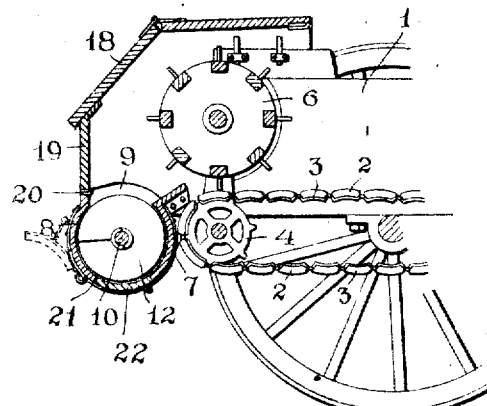
Figure 3:
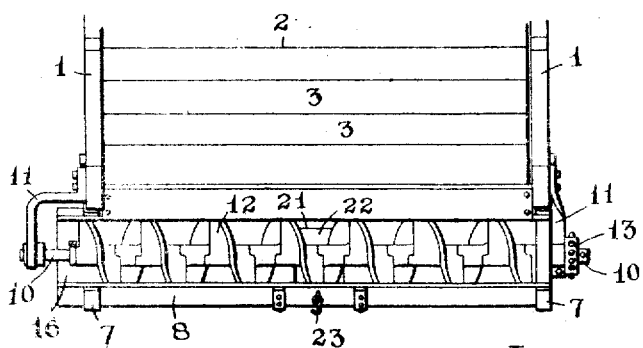

Figure 1 is a rear view of a manure spreader embodying my invention. Fig. 2 is a central sectional view of the same, and Fig. 3 is a top view of the same with the hood and beater removed.

Similar reference letters and figures refer to similar parts in the different views.

My invention relates to improvements in manure spreaders by which the manure as desired, may be either deposited in drills or furrows or may be spread broadcast from the carrying receptacle.

Referring to the accompanying drawings, 1 denotes the body of the cart or other receptacle in which the manure is carried.

2 is an endless moving apron forming the bottom of the cart 1, and composed of slats 3 fastened together and revolving over a sprocket wheel 4 at the rear of the cart, and a similar sprocket wheel at the front of the cart, not shown. The apron 2 is operatively connected by actuating mechanism with one of the supporting wheels in the ordinary and well known manner. The beater 6 is provided with a driving mechanism which is also connected with one of the rear supporting wheels in the ordinary manner, as will be well understood by those conversant with manure spreaders. The above traveling bottom and beater and means for revolving both are well known and form no part of my invention.

Attached to the rear of the cart at each side are curved arms 7, 7, which support a barrel 8 open at the top at 9, which opening is at approximately the level of the traveling apron 2. A shaft 10 is supported concentric with the barrel 8 by means of brackets 11, 11, and an endless screw 12 is attached to the shaft 10. At one end of the shaft 10 is a sprocket wheel 13 which is connected by a chain 14 with a sprocket wheel 15 attached to the shaft of the beater 6. The opposite end 16 of the barrel 8 is left open, and the rotation of the screw 12 by means of the sprocket wheel 13 and chain 14 is toward the open end 16 of the barrel 8. Mounted on the body of the cart and extending over each end of the barrel 8 are side pieces 17 which serve to support the ends of a jointed cover 18. This cover 18 is hinged above the beater and the lower side rests upon a tail piece 19 hinged to the barrel 8 at 20.

In the center and on the lower side of the barrel 8 is an opening 21 which is closed by a hinged cover 22; a hook 23 is provided to hold the cover 22 in its open position.

The operation of my device is as follows:—The manure placed in the cart is fed, when the cart is in motion, toward the beater by the traveling bottom or apron 2. The revolving beater disintegrates the manure and imparts a movement to it away from the rear end of the cart. The motion is arrested by the hinged cover 18 and the sides 17 which contact with and still further disintegrate the manure, and the flying particles of manure fall through the opening 9 into the barrel 8. The screw 12 revolving in the direction of the open end 16 of the barrel 8 impels the manure in the barrel 8 through the open end 16 and it falls into a drill or furrow through which the cart is passing. If it is desired to place manure in two furrows or drills at once, the cover 22 is removed from the opening 21, and, the cart being in the proper position, the manure in one half of the barrel 8 is driven out through the opening 21 into one furrow and through the open end 16 into another.

The cart may be quickly adjusted so that it will cover the ground broadcast with manure, by folding back the hinged cover 18, thereby allowing the manure from the beater to escape from the tail of the cart, and by dropping the hinged tail piece 19 to cover the opening 9 in the barrel 8, which prevents the entrance of manure into the barrel 8.

What I claim as my invention and desire to secure by Letters Patent is:—

1. In a manure spreader, the combination with a rotary beater, of a barrel provided with an opening for receiving the manure from said beater, means for distributing the manure in drills from said barrel, removable means for guiding the manure from said beater to said opening in said barrel, and removable means for closing said opening.

2. In a manure spreader, the combination with a rotary beater arranged to deliver manure broadcast, of a barrel and means for delivering the manure in drills from said barrel, means for covering said beater, and means for opening said barrel, whereby the manure is deposited from said beater in said barrel, said means adjustable to close said barrel and expose said beater, whereby the manure is delivered broadcast from said beater.

3. In a manure spreader, the combination with a revolving beater arranged to deliver manure broadcast, of a barrel with its axis parallel to the axis of said beater, means for directing the manure from said beater to said barrel, said barrel provided with an opening equal in length to the length of said beater to receive manure from said beater, and a removable cover to close said opening.

4. In a manure spreader, the combination with a rotary beater arranged to deliver the manure broadcast, of a barrel provided with an opening for receiving the manure from said beater, means for directing the manure as delivered from said beater to said opening in said barrel, means for delivering the manure in drills from said barrel, and removable means for preventing the entrance of manure into said barrel.

5. In a manure spreader, the combination with a rotary beater, of a barrel provided with an opening in its top for receiving the manure from said beater, a removable cover for said beater, and a hinged cover for the opening in said barrel arranged to coöperate in its vertical position with said cover in guiding the manure from said beater to said barrel.

6. In a manure spreader, the combination with a rotary beater, a barrel with its axis parallel with the axis of said beater, an opening in the end of said barrel and an additional opening in the bottom, and means for delivering the manure in said barrel entirely through the open end or through both the open end and the intermediate opening at will, and removable means for preventing the entrance of manure into said barrel.

Dated this 31st day of October 1905.

THEOPHILUS BROWN.

Witnesses:
PENELOPE COMBERBACH,
RUFUS B. FOWLER.